US008617781B2

United States Patent
Kawauchi

(10) Patent No.: US 8,617,781 B2
(45) Date of Patent: Dec. 31, 2013

(54) CARRIER CORE PARTICLES FOR ELECTROPHOTOGRAPHIC DEVELOPER, METHOD FOR MANUFACTURING THE SAME, CARRIER FOR ELECTROPHOTOGRAPHIC DEVELOPER AND ELECTROPHOTOGRAPHIC DEVELOPER

(75) Inventor: Takeshi Kawauchi, Okayama (JP)

(73) Assignees: Dowa Electronics Materials Co., Ltd., Tokyo (JP); Dowa IP Creation Co., Ltd., Okayama (JP)

( * ) Notice: Subject to any disclaimer, the term of this patent is extended or adjusted under 35 U.S.C. 154(b) by 0 days.

(21) Appl. No.: 13/522,398

(22) PCT Filed: Jan. 25, 2011

(86) PCT No.: PCT/JP2011/051328
§ 371 (c)(1),
(2), (4) Date: Jul. 16, 2012

(87) PCT Pub. No.: WO2011/093276
PCT Pub. Date: Aug. 4, 2011

(65) Prior Publication Data
US 2012/0295195 A1 Nov. 22, 2012

(30) Foreign Application Priority Data
Jan. 29, 2010 (JP) .................. 2010-019075

(51) Int. Cl.
*G03G 9/00* (2006.01)

(52) U.S. Cl.
USPC ............... 430/111.3; 430/111.1; 430/111.31; 430/111.32; 430/111.33

(58) Field of Classification Search
USPC ............... 430/111.1, 111.3, 111.31, 111.32, 430/111.33
See application file for complete search history.

(56) References Cited

U.S. PATENT DOCUMENTS

| | | | |
|---|---|---|---|
| 2008/0171281 A1* | 7/2008 | Kobayashi et al. | 430/111.31 |
| 2009/0246676 A1* | 10/2009 | Tabira et al. | 430/111.33 |
| 2009/0246677 A1* | 10/2009 | Tabira et al. | 430/111.33 |

FOREIGN PATENT DOCUMENTS

| | | |
|---|---|---|
| JP | 07-209916 | 8/1995 |
| JP | 2003-533743 | 11/2003 |
| JP | 2007-271663 | 10/2007 |
| JP | 2007-273505 | 10/2007 |
| JP | 2009-244571 | 10/2009 |

* cited by examiner

Primary Examiner — Stewart Fraser
(74) Attorney, Agent, or Firm — Clark & Brody

(57) ABSTRACT

The carrier core particles 11 for electrophotographic developer contain lithium as a core composition. When the carrier core particles 11 are immersed in pure water at a weight ratio of 1 part core particles 11 to 10 parts pure water and shaken, the amount of lithium that leaches out to the pure water is 0.10 ppm or lower.

8 Claims, 4 Drawing Sheets

CARRIER CORE PARTICLES FOR ELECTROPHOTOGRAPHIC DEVELOPER, METHOD FOR MANUFACTURING THE SAME, CARRIER FOR ELECTROPHOTOGRAPHIC DEVELOPER AND ELECTROPHOTOGRAPHIC DEVELOPER

TECHNICAL FIELD

This invention relates to carrier core particles for electrophotographic developer (hereinafter, sometimes simply referred to as "carrier core particles"), a method for manufacturing the carrier core particles, carrier for electrophotographic developer (hereinafter, sometimes simply referred to as "carrier"), and electrophotographic developer (hereinafter, sometimes simply referred to as "developer"). More particularly, this invention relates to carrier core particles contained in electrophotographic developer used in copying machines, MFPs (Multifunctional Printers) or other types of electrophotographic apparatuses, a method for manufacturing the carrier core particles, carrier contained in electrophotographic developer, and electrophotographic developer.

BACKGROUND ART

Electrophotographic dry developing systems employed in a copying machine, MFP or other types of electrophotographic apparatuses are categorized into a system using a one-component developer containing only toner and a system using a two-component developer containing toner and carrier. In either of these developing systems, toner charged to a predetermined level is applied to a photoreceptor. An electrostatic latent image formed on the photoreceptor is rendered visual with the toner and is transferred to a sheet of paper. The image visualized by the toner is fixed on the paper to obtain a desired image.

A brief description about development with the two-component developer will be given. A predetermined amount of toner and a predetermined amount of carrier are accommodated in a developing apparatus. The developing apparatus is provided with a rotatable magnet roller with a plurality of south and north poles alternately arranged thereon in the circumferential direction and an agitation roller for agitating and mixing the toner and carrier in the developing apparatus. The carrier made of a magnetic powder is carried by the magnet roller. The magnetic force of the magnet roller forms a straight-chain like magnetic brush of carrier particles. Agitation produces triboelectric charges that bond a plurality of toner particles to the carrier particles. The magnetic brush abuts against the photoreceptor with rotation of the magnet roller to supply the toner to the surface of the photoreceptor. Development with the two-component developer is carried out as described above.

Fixation of the toner on a sheet of paper results in successive consumption of toner in the developing apparatus, and new toner in the same amount as that of the consumed toner is supplied, whenever needed, from a toner hopper in the developing apparatus. On the other hand, the carrier is not consumed for development and is used as it is until the carrier comes to the end of its life. The carrier, which is a component of the two-component developer, is required to have various functions including: a function of triboelectrically charging the toner by agitation in an effective manner; insulation properties; and a toner transferring ability to appropriately transfer the toner to the photoreceptor. To improve the toner charging performance, the recent carrier is especially required to have appropriate electric resistance (hereinafter, sometimes simply referred to as "resistance") and appropriate insulation properties.

From the viewpoint of environmental-friendly copy machine components and the safety issues, some recently devised carriers do not contain heavy metals, such as copper (Cu), zinc (Zn), manganese (Mn), which used to be contained in conventional non-coated carrier. These carriers are composed of, for example, carrier core particles mainly made of soft ferrite and coating resin covering the surface of the carrier core particles. Both the carrier core particles and resin offer toner charging performance and proper insulation properties to the resin-coated carrier. Techniques of manufacturing the carrier core particles of the resin-coated carrier are disclosed in Japanese Unexamined Patent Application Publication Nos. 2007-271663 (PTL 1) and 2007-273505 (PTL 2). The method for manufacturing the carrier core particles shown in PTL 1 and PTL 2 will be briefly described. First, slurry is prepared from raw materials, such as magnetite ($Fe_3O_4$), and then the slurry is granulated into carrier core particles by a spray dry method or other methods. Second, the granulated material is fired to urge reduction reaction thereof to form a magnetic phase. Third, the granulated material is disintegrated and classified to obtain granules of a desired particle size. At last, the granules are oxidized.

CITATION LIST

Patent Literature

PTL 1: Japanese Unexamined Patent Application Publication No. 2007-271663
PTL 2: Japanese Unexamined Patent Application Publication No. 2007-273505

SUMMARY OF INVENTION

Technical Problem

In general, copying machines are installed and used in offices of companies; however, there are various office environments around the world. For instance, some copying machines are used under high-temperature environments at approximately 30° C., while some are used under high-humidity environments at approximately 90% RH. On the contrary, some copying machines are used under low-temperature environments at approximately 10° C., while some are used under low-humidity environments at approximately 35% RH. Even under conditions with different temperatures and relative humidities, developer stored in a developing apparatus in a copying machine is expected to reduce the property change. The carrier core particles making up the carrier are also desired to reduce their property changes in various environments, in other words, to be less dependent on environments.

However, the carrier core particles as disclosed in PTL 1 and PTL 2 have a great difference in the properties between low relative humidity and high relative humidity. Specifically, the difference between the resistance in low relative humidity and the resistance in high relative humidity are relatively very large. Such carrier core particles are likely to be influenced by environmental changes on a large scale, which may degrade the image quality. This is because, for example, the resin-coated carrier may sometimes lose small pieces of the coating resin during agitation in the developing apparatus and the parts of carrier core particle at which the coating resin is peeled off directly demonstrate the properties of the carrier core particle. Such a carrier core particle that is likely to change its resistance according to environmental change may have an adverse effect on image quality.

The basic properties desired for the carrier core particles include having good electrical characteristics, more specifically, for example, being capable of holding a large amount of electric charges and having a high dielectric breakdown voltage. In addition, from the aforementioned viewpoint, the carrier core particles are desired to have an appropriate resistance value.

An object of the present invention is to provide carrier core particles for electrophotographic developer, which have good electric characteristics and low environmental dependency.

Another object of the present invention is to provide a method for manufacturing carrier core particles for electrophotographic developer, which have good electrical characteristics and low environmental dependency.

Yet another object of the present invention is to provide carrier for electrophotographic developer, which has good electrical characteristics and low environmental dependency.

Yet another object of the present invention is to provide electrophotographic developer capable of forming good quality images under various environments.

Solution to Problem

The carrier core particles for electrophotographic developer according to the present invention are carrier core particles that are used in electrophotographic developer and contain lithium as a core composition. When the carrier core particles are immersed in pure water at a weight ratio of 1 part core particles to 10 parts pure water and shaken, the amount of lithium that leaches out to the pure water is 0.10 ppm or lower.

The carrier core particles for electrophotographic developer containing lithium as a core composition have good electrical characteristics. The amount of lithium that leaches out to pure water after the carrier core particles are immersed in the pure water at a weight ratio of 1 part core particles to 10 parts pure water and shaken is 0.10 ppm (parts per million) or lower, thereby forming the carrier core particles containing a small amount of lithium in the top surfaces thereof. Thus, the lithium present in the top surface of the carrier core particle for electrophotographic developer affects the carrier core particle less in terms of environmental dependency. For example, resistance reduction in high humidity caused by the lithium present in the top surface of the carrier core particle can be suppressed. Therefore, the carrier core particles for electrophotographic developer have good electrical characteristics and low environmental dependency. Note that "core" refers to "carrier core particle".

Preferably, the carrier core particles for electrophotographic developer contain 10 ppm to 400 ppm of lithium. The carrier core particles having such a core composition in which the amount of Li in Fe is controlled to be infinitesimal can reduce the magnetic deterioration.

In a more preferable embodiment, the difference between the logarithm of the core resistance with the application of 1000 V/cm at an absolute humidity of 21 g/m$^3$ and the logarithm of the core resistance with the application of 1000 V/cm at an absolute humidity of 3.3 g/m$^3$ is 2.50 or less.

In a yet more preferable embodiment, the ratio between the logarithm of the core resistance with the application of 1000 V/cm at an absolute humidity of 21 g/m$^3$ and the logarithm of the core resistance with the application of 1000 V/cm at an absolute humidity of 3.3 g/m$^3$ is 1.25 or less.

The carrier core particles for electrophotographic developer according to the present invention are carrier core particles that are used in electrophotographic developer and contain lithium as a core composition. The carrier core particles are obtained by mixing and granulating raw materials including lithium; firing powdery material, which is obtained by granulating the raw materials, at a predetermined temperature to form a magnetic phase; oxidizing granules, which are obtained by firing the powdery material; immersing the oxidized granules in a hydroxyl-group-containing solvent; and drying the resultant granules.

In another aspect of the present invention, a method for manufacturing carrier core particles for electrophotographic developer is a method for manufacturing carrier core particles that are used in electrophotographic developer and contain lithium as a core composition. The method includes: a granulation step of mixing and granulating raw materials including lithium; a firing step of firing powdery material, which is obtained by granulating the raw materials in the granulation step, at a predetermined temperature to form a magnetic phase; an oxidation step of oxidizing granules, which are obtained by firing the powdery material; a solvent treatment step of immersing the fired granules in a hydroxyl-group-containing solvent after the firing step; and a drying step of drying the resultant granules after the solvent treatment step.

The carrier core particles for electrophotographic developer manufactured through the above method contain lithium as a core composition and therefore have good electrical characteristics. In addition, the solvent treatment in which the carrier core particles are immersed in the hydroxyl-group-containing solvent reduces the amount of lithium present in the top surface of the carrier core particle, and therefore the lithium present in the top surface of the carrier core particle for electrophotographic developer affects the carrier core particle less in terms of environmental dependency. For example, resistance reduction in high humidity caused by the lithium present in the top surface of the carrier core particle can be suppressed. The carrier core particles manufactured by the above method can obtain a small resistance difference, for example, between high absolute humidity and low absolute humidity. Thus, the manufacturing method can provide carrier core particles having good electrical characteristics and low environmental dependency.

Preferably, the solvent treatment step includes a treatment step using any one of alcohol, water and a mixture thereof as a solvent. Such a solvent is relatively stable and the aftertreatment can be conducted easily. In addition, the solvent is inexpensive and therefore cost-effective.

More preferably, the oxidation step is performed between the firing step and solvent treatment step.

In yet another aspect of the present invention, carrier for electrophotographic developer is carrier contained in developer for electrophotography. The carrier is composed of carrier core particles and resin coating the surfaces of the carrier core particles. The carrier core particles contain lithium as a core composition, and the amount of lithium that leaches out to pure water after the carrier core particles are immersed in the pure water at a weight ratio of 1 part core particles to 10 parts pure water and shaken is 0.10 ppm or lower.

The carrier for electrophotographic developer has good electrical characteristics and low environmental dependency.

Yet another aspect of the present invention directs to electrophotographic developer used to develop electrophotographic images, including: carrier composed of carrier core particles containing lithium as a core composition, the amount of lithium that leaches out to pure water after the carrier core particles are immersed in the pure water at a weight ratio of 1 part core particles to 10 parts pure water and shaken being 0.10 ppm or lower, and resin covering the surface of the carrier core particle; and toner that can be triboelectrically charged by frictional contact with the carrier for development of electrophotographic images.

Such electrophotographic developer includes the carrier having good electrical characteristics and low environmental dependency, and therefore can form good quality images in various environments.

Advantageous Effects of Invention

The carrier core particles for electrophotographic developer according to the present invention contain lithium as a core composition and therefore have good electrical characteristics. In addition, the amount of lithium that leaches out to pure water after the carrier core particles are immersed in the pure water at a weight ratio of 1 part core particles to 10 parts pure water and shaken is 0.10 ppm or lower, thereby forming the carrier core particles containing a small amount of lithium in the top surface thereof. Thus, the lithium present in the top surface of the carrier core particle affects the carrier core particle less in terms of environmental dependency. For example, resistance reduction in high humidity caused by the lithium present in the top surface of the carrier core particle can be suppressed. Therefore, the carrier core particles for electrophotographic developer can obtain good electrical characteristics and low environmental dependency.

According to the method for manufacturing the carrier core particles for electrophotographic developer of the present invention, the carrier core particles including lithium as a core composition have good electrical characteristics. In addition, the solvent treatment in which the carrier core particles are immersed in the hydroxyl-group-containing solvent reduces the amount of lithium present in the top surface of the carrier core particle, and therefore the lithium present in the top surface of the carrier core particle for electrophotographic developer affects the carrier core particle less in terms of environmental dependency. For example, resistance reduction in high humidity caused by the lithium present in the top surface of the carrier core particle can be suppressed. The carrier core particles manufactured by the above method can obtain a small resistance difference, for example, between high absolute humidity and low absolute humidity. Thus, the manufacturing method can provide carrier core particles having good electrical characteristics and low environmental dependency.

The carrier for electrophotographic developer according to the invention has good electrical characteristics and low environmental dependency.

The electrophotographic developer according to the present invention includes the carrier having good electrical characteristics and low environmental dependency, and therefore can form good quality images in various environments.

DESCRIPTION OF EMBODIMENTS

Figure 1:
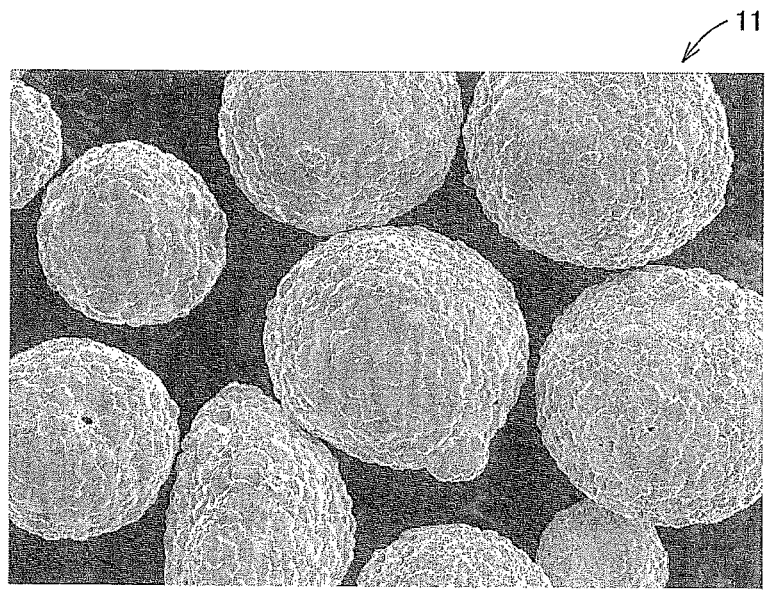
FIG. 1 is an electron micrograph showing the external appearance of carrier core particles according to an embodiment of the invention.

With reference to the drawings, an embodiment of the present invention will be described. First, carrier core particles according to the embodiment of the invention will be described. FIG. 1 is an electron micrograph showing the external appearance of carrier core particles according to the embodiment of the invention.

Referring to FIG. 1, carrier core particles 11 according to the embodiment of the invention are roughly spherical in shape, approximately 35 μm in diameter and have proper particle size distribution. The diameter of a carrier core particle implies a mean volume diameter. The diameter and particle size distribution are set to any values to satisfy the required developer characteristics, yields of manufacturing steps and some other factors. On the surfaces of the carrier core particles 11, there are fine asperities that are formed in a firing step, which will be described later, and provide a somewhat rough texture.

The carrier core particles 11 are formulated to contain lithium as a core composition. When the carrier core particles 11 are immersed in pure water at a weight ratio of 1 part core particles to 10 parts pure water and shaken, the amount of lithium that leaches out to the pure water is 0.10 ppm or lower.

Such carrier core particles 11 containing lithium as a core composition have good electrical characteristics. In addition, the amount of lithium that leaches out to pure water after the carrier core particles 11 are immersed in the pure water at a weight ratio of 1 part core particles to 10 parts pure water and shaken is 0.10 ppm or lower, thereby forming the carrier core particles containing a small amount of lithium in the top surface thereof. Thus, the lithium present in the top surface of the carrier core particle 11 for electrophotographic developer affects the carrier core particle less in terms of environmental dependency. For example, resistance reduction in high humidity caused by the lithium present in the top surface of the carrier core particle 11 can be suppressed. Therefore, the carrier core particles 11 for electrophotographic developer can obtain good electrical characteristics and low environmental dependency. This will be described later.

Figure 2:
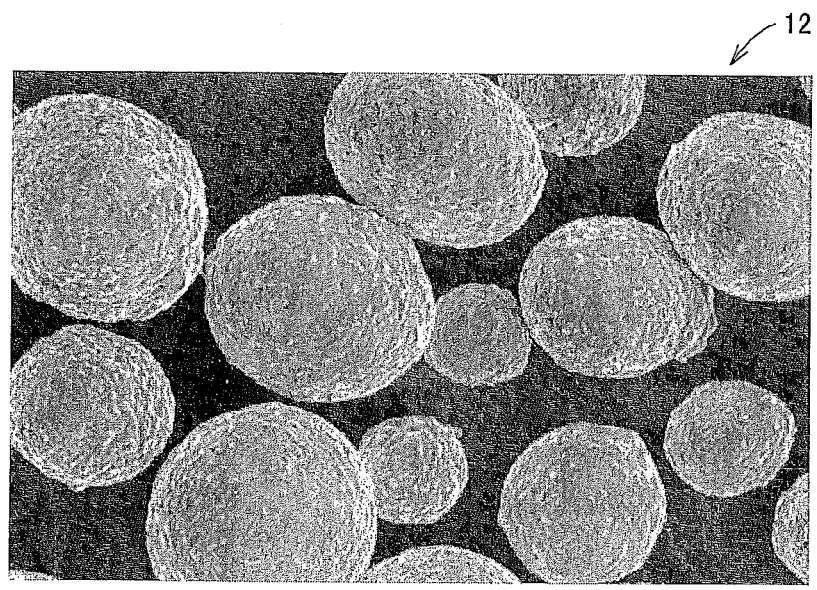
FIG. 2 is an electron micrograph showing the external appearance of carrier particles according to the embodiment of the invention.

FIG. 2 is an electron micrograph showing the external appearance of carrier particles according to the embodiment of the invention. Referring to FIG. 2, the carrier particles 12 of the embodiment of the invention are roughly spherical in shape as with the carrier core particles 11. The carrier particles 12 are made by coating, or covering, the carrier core particles 11 with a thin resin film and have almost the same diameter as the carrier core particles 11. The surfaces of the carrier particles 12 are almost completely covered with resin, which is different from the carrier core particles 11, and have less asperity compared with the surfaces of the carrier core particles 11.

Figure 3:
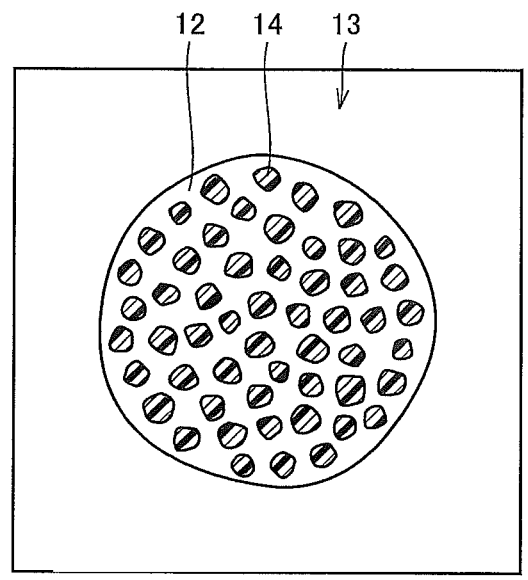
FIG. 3 depicts the external appearance of a developer particle according to the embodiment of the invention.

FIG. 3 is an external view schematically showing a developer particle according to the embodiment of the invention. Referring to FIG. 3, the developer particle 13 includes a carrier particle 12 shown in FIG. 2 and toner particles 14. The toner particles 14 are also roughly spherical in shape. The toner 14 contains mainly styrene acrylic-based resin or polyester-based resin and a predetermined amount of pigment, wax and other ingredients combined therewith. Such toner 14 is manufactured by, for example, a pulverizing method or polymerizing method. The toner particles 14 in use are, for example, approximately 5 μm in diameter, which is about one-seventh of the diameter of the carrier particles 12. The compounding ratio of the toner 14 and carrier 12 is also set to any value according to the required developer characteristics. Such a developer 13 is manufactured by mixing a predetermined amount of the carrier 12 and toner 14 by a suitable mixer.

Figure 4:
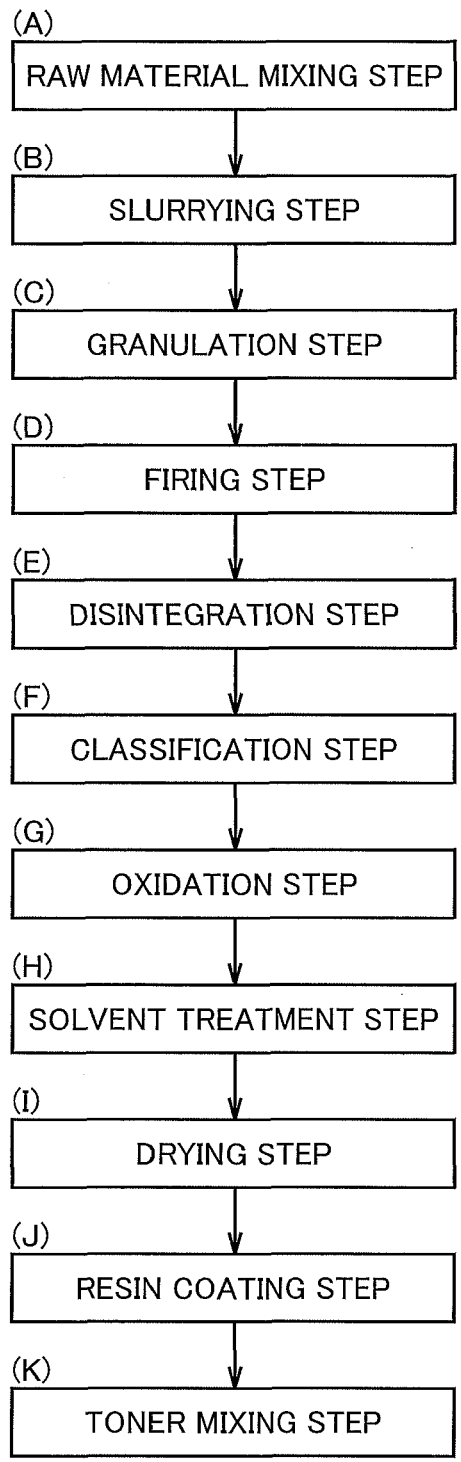
FIG. 4 is a flow chart showing the main steps of a method for manufacturing the carrier core particles according to the embodiment of the invention.

A method for manufacturing the carrier core particles according to the embodiment of the invention will be described. FIG. 4 shows a flow chart of the main steps in the method for manufacturing the carrier core particles according to the embodiment of the invention. Along FIG. 4, the method for manufacturing the carrier core particles of the invention will be described below.

First, raw materials containing lithium are prepared to form the carrier core particles. The prepared raw materials are formulated at an appropriate compounding ratio to meet the required characteristics, and mixed (FIG. 4(A)). The carrier core particles according to the invention do not contain heavy metals, such as copper, zinc and manganese, to respond to environmental concerns. The carrier core particles of the invention can function as carrier after resin is applied on the surface of the carrier core particles containing magnetite as a main ingredient.

The iron raw material making up the carrier core particles according to the invention can be metallic iron or an oxide thereof, and more specifically, preferred materials include $Fe_2O_3$, $Fe_3O_4$ and Fe, which can stably exist at room temperature and atmospheric pressure.

Preferable Li (lithium) raw material to be added to the carrier core particles is $Li_2CO_3$, LiOH, $LiOH.H_2O$ or the like. It is preferable to contain a trace amount of lithium, specifically, 10 ppm to 400 ppm lithium, and more preferably 30 ppm to 280 ppm lithium. A lithium content of 10 ppm or higher can retard the oxidation rate of magnetite contained in the carrier core particle, can suppress the reduction of magnetization of carrier core particle, and also can easily control the resistance within a target range. On the other hand, a lithium content of higher than 400 ppm causes difficulty of efficient magnetization reduction, and therefore the preferable lithium content is 400 ppm or lower. As described above, controlling the amount of the core composition Li with respect to Fe to a trace amount ranged as described above can achieve a high magnetization required for the characteristics of the carrier core particle, in other words, can suppress the reduction of the magnetization. Note that the high magnetization in this description denotes, for example, specifically, magnetization σ1000 under an external magnetic field of 1000 Oe is 50 emu/g or higher.

In order to enhance the strength of the carrier core particle, $SiO_2$ can be added to magnetite contained in the carrier core particle. A preferable $SiO_2$ raw material is chosen from amorphous silica, crystalline silica, colloidal silica or the like, or a raw material obtained by calcining and pulverizing one of these raw materials.

Next, the mixed raw materials are slurried (FIG. 4(B)). In other words, these raw materials are weighed to make a target composition of magnetite particles making up the carrier core particles and mixed together to make a slurry raw material.

The method for manufacturing the carrier core particles according to the invention requires acceleration of reduction reaction. To accelerate reduction reaction, a reduction agent may be further added to the slurry raw material. A preferred reducing agent may be carbon powder, polycarboxylic acid-based organic substance, polyacrylic acid-based organic substance, maleic acid, acetic acid, polyvinyl alcohol (PVA)-based organic substance, or mixtures thereof.

Water is added to the slurry raw material that is then mixed and agitated so as to contain 40 wt % of solids or more, preferably 50 wt % or more. The slurry raw material containing 50 wt % of solids or more is preferable because such a material can maintain the strength of granulated pellets.

Subsequently, the slurried raw material is granulated (FIG. 4(C)). Granulation of the slurry obtained by mixing and agitation is performed with a spray drier. Note that it may be preferable to subject the slurry to dry pulverization before the granulation step.

Figure 5:
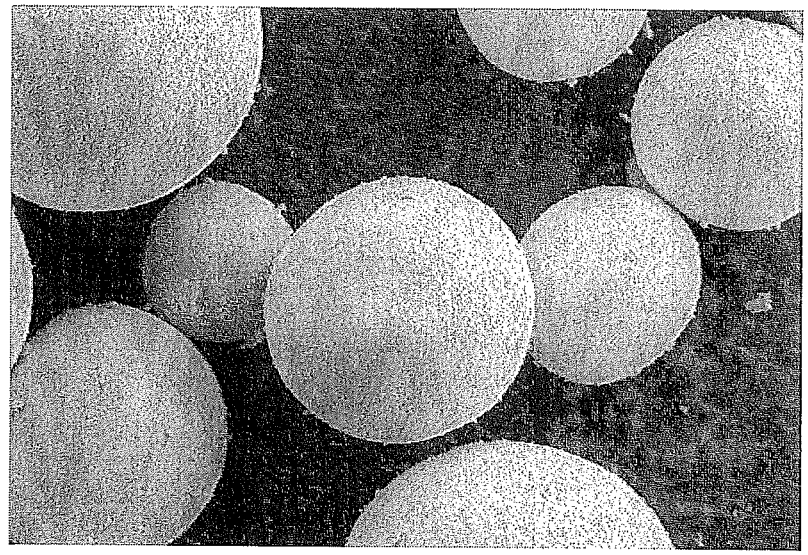
FIG. 5 is an electron micrograph showing the external appearance of granulated material made through the method for manufacturing the carrier core particles according to the embodiment of the invention.

The temperature of an atmosphere during spray drying can be set to approximately 100° C. to 300° C. This can provide granulated powder whose particles are approximately 10 to 200 μm in diameter. In consideration of the final diameter of the particles as a product, it is preferable to filter the obtained granulated powder by a vibrating sieve or the like to remove coarse particles and fine powder for particle size adjustment at this point of time. For reference purpose, FIG. 5 shows an electron micrograph of the carrier core particles just after being granulated.

Subsequently, the granulated material is fired (FIG. 4(D)). Specifically, the obtained granulated powder is placed in a furnace heated to approximately 900° C. to 1500° C. and fired for 1 to 24 hours to produce a target fired material. During firing, the oxygen concentration in the firing furnace can be set to any value, but should be enough to advance fertilization reaction. Specifically speaking, when the furnace is heated to 1200° C., a gas is introduced and flows in the furnace to adjust the oxygen concentration from $10^{-7}$% to 1%.

Alternatively, a reduction atmosphere required for transforming into magnetite can be made by adjusting the aforementioned reducing agent. To achieve a reaction speed that provides sufficient productivity in an industrial operation, the preferable temperature is 900° C. or higher. If the firing temperature is 1500° C. or lower, the particles are not excessively sintered and can remain in the form of powder upon completion of firing, and furthermore, such a high temperature can prevent composition deviation in the produced magnetite from occurring due to lithium evaporation during the firing operation.

It is preferable at this stage to control the particle size of the fired material. For example, the fired material is coarsely ground by a hammer mill or the like. In other words, the fired granules are disintegrated (FIG. 4(E)). After disintegration, classification is carried out with a vibrating sieve or the like. In other words, the disintegrated granules are classified (FIG. 4(F)) to obtain carrier core particles with a predetermined diameter.

Then, the classified granules undergo oxidation (FIG. 4(G)). The surfaces of the carrier core particles obtained at this stage are heat-treated (oxidized) to increase the particle breakdown voltage to 250 V or higher, thereby imparting an appropriate electric resistance value, from $1 \times 10^6$ to $1 \times 10^{13}$ Ω·cm, to the carrier core particles. Increasing the electric resistance of the carrier core particles through oxidation can prevent the carrier from scattering caused by charge leakage.

More specifically, the granules are placed in an atmosphere with an oxygen concentration of 10% to 100%, at a temperature of 200° C. to 700° C., for 0.1 to 24 hours to obtain the target carrier core particles. More preferably, the granules are placed at a temperature of 250° C. to 600° C. for 0.5 to 20 hours, further more preferably, at a temperature of 300° C. to 550° C. for 1 to 12 hours.

Next, the oxidized granules are immersed in a hydroxyl-group-containing solvent (FIG. 4(H)). The inventors of the present invention used ferrite that met environmental regulations and conducted a study to reduce resistance fluctuations caused by environmental variations for the purpose of further image quality improvement. As a result, the inventors found that lithium (Li), which was a substance of the core composition and present in the top surface of the core, had a profound effect on the carrier core particles with environmental variations. Because lithium was soluble in a hydroxyl-group-containing solvent, the inventors conceived a solvent treatment step of immersing the carrier core particles in a hydroxyl-group-containing solvent in order to remove lithium in the top surface of the carrier core particles. The resistance value of the resultant carrier core particles manufactured by the manufacturing method is, for example, not decreased in high absolute humidity, and therefore the resistance difference between high absolute humidity and low absolute humidity can be narrowed. Thus, the manufacturing method can produce carrier core particles with low environmental dependency.

The solvent to be used is preferably pH 3 to 12, and more preferably pH 5 to 9. The temperature of the solvent is controlled preferably to 10° C. to 50° C. for stable control; however, for further reduction of environmental dependency as will be described later, it is more preferable to use a solvent of approximately 100° C.

The solvent treatment is conducted to remove Li present in the top surface of the carrier core particles, and therefore conducting the solvent treatment only to the outer surface of the particles can provide the targeted effect. Whether the solvent treatment is conducted for 1 hour or 1 day does not matter; however, from the viewpoint of cost-consciousness, setting the time in which the granules are in contact with the solvent, for example, within 10 minutes achieves efficient solvent treatment relatively in a short time.

Figure 6:
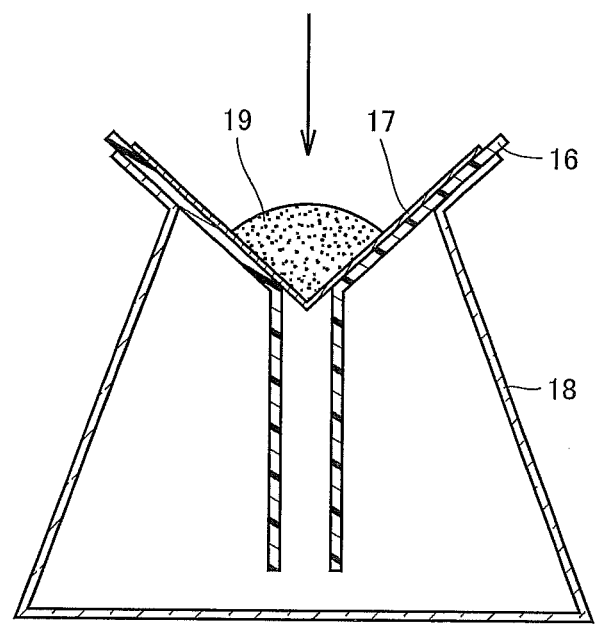
FIG. 6 is a schematic view of tools used in a solvent treatment step of the method for manufacturing the carrier core particles according to the embodiment of the invention.

Detailed description about a treatment step using a solvent, or a solvent treatment step, will be now made. FIG. 6 is a schematic view of tools used in the solvent treatment step. Referring to FIG. 6, a piece of filter paper 17, which is a mesh member on which granules can be placed, and a funnel 16 and a conical flask 18 are prepared for the solvent treatment step. The mesh size of the filter paper 17 is chosen so that the carrier core particles 19, in the form of granules, having the aforementioned particle size and particle distribution do not pass through. The filter paper 17 is placed on the funnel 16, and the funnel with the filter paper 17 is set on the conical flask 18. Then, the carrier core particles 19 are put on the filter paper 17. Subsequently, a hydroxyl-group-containing solvent, or, for example, a predetermined amount of pure water is poured on the carrier core particles 19 on the filter paper 17 as shown by an arrow in FIG. 6. The solvent treatment is performed in this manner. The pure water remains in the conical flask 18 after treatment. This step is referred to as a filtering step.

In addition, the solvent treatment step can include a step of removing the solvent after the granules are put in the solvent and agitated. The solvent treatment step can be any other method as long as the method can remove lithium in the top surface. Even the other method can produce an effect of the present invention.

Subsequently, the granules subjected to the solvent treatment are dried (FIG. 4(I)). The drying step can include either one of a vacuum drying step for drying the treated granules in a vacuum and a thermal drying step for applying heat to dry the treated granules. These drying steps can reliably dry the granules. Water removal is the aim of the drying steps. Specifically, in the vacuum drying step, the core particles are put in a container for drying and the container is vacuumed by an oil-sealed rotary vacuum pump to dry the core particles. The oil-sealed rotary vacuum pump used in this embodiment is model TSW-50 manufactured by SATO VAC INC. Alternatively, the core particles may be dried naturally without dryers. Furthermore, in the thermal drying step, the core particles are dried concretely, although depending on the amount to be treated, at 30° C. to 500° C. for 1 minute to 1 day, preferably at 30° C. to 100° C. for 2 minutes to 2 hours, and more preferably for 5 minutes to 1 hour.

The carrier core particles according to the embodiment of the invention are manufactured as described above. In short, the method for manufacturing the carrier core particles for electrophotographic developer is a method for manufacturing carrier core particles for electrophotographic developer containing lithium as a core composition and includes a granulation step of mixing and granulating raw materials including lithium, a firing step of firing the powdery material granulated in the granulation step at a predetermined temperature to form a magnetic phase, an oxidation step of oxidizing the fired granules, a solvent treatment step of immersing the oxidized granules in a hydroxyl-group-containing solvent after the firing step, and a drying step of drying the resultant granules after the solvent treatment step.

The carrier core particles for electrophotographic developer manufactured by the above method include lithium as a core composition and therefore have good electrical characteristics. In addition, the solvent treatment in which the carrier core particles are immersed in the hydroxyl-group-containing solvent reduces the amount of lithium present in the top surface of the carrier core particle, and therefore the lithium present in the top surface of the carrier core particle for electrophotographic developer affects the carrier core particle less in terms of environmental dependency. For example, resistance reduction in high humidity caused by the lithium present in the top surface of the carrier core particle can be suppressed. The carrier core particles manufactured by the above method can obtain a small resistance difference, for example, between high absolute humidity and low absolute humidity. Thus, the manufacturing method can provide carrier core particles having good electrical characteristics and low environmental dependency.

The carrier core particles according to the present invention are carrier core particles for electrophotographic developer containing lithium as a core composition. The carrier core particles are obtained by mixing and granulating raw materials including lithium, firing the granulated powdery material at a predetermined temperature to form a magnetic phase, oxidizing the fired granules, immersing the oxidized granules in a hydroxyl-group-containing solvent, and drying the resultant granules.

The carrier core particles thus obtained are coated with resin (FIG. 4(J)). Specifically, the carrier core particles obtained according to the invention are coated with silicone-based resin, acrylic resin, or the like that imparts electrification ability and improves durability, resulting in carrier for electrophotographic developer. The coating with silicone-based resin, acrylic resin or the like can be done by well-known techniques.

In other words, the carrier for electrophotographic developer is carrier contained in developer for electrophotography. The carrier is composed of carrier core particles and resin coating the surface of the carrier core particles. The carrier core particles contain lithium as a core composition, and the amount of lithium that leaches out to pure water after the carrier core particles are immersed in the pure water at a weight ratio of 1 part core particles to 10 parts pure water and shaken is 0.10 ppm or lower.

The carrier for electrophotographic developer has good electrical characteristics and low environmental dependency.

Next, the carrier thus obtained and toner are mixed in predetermined amounts (FIG. 4(K)). Specifically, the carrier for electrophotographic developer according to the invention is mixed with an appropriate well-known toner. In this manner, the electrophotographic developer according to the embodiment of the invention can be achieved. The carrier and toner are mixed by any kinds of mixer, for example, a ball mill.

In other words, the electrophotographic developer used to develop electrophotographic images, includes: carrier composed of carrier core particles containing lithium as a core composition, the amount of lithium that leaches out to pure water after the carrier core particles are immersed in the pure water at a weight ratio of 1 part core particles to 10 parts pure water and shaken being 0.10 ppm or lower, and resin covering the surface of the carrier core particle; and toner that can be triboelectrically charged by frictional contact with the carrier for development of electrophotographic images.

The electrophotographic developer includes the carrier having good electrical characteristics and low environmental dependency, and therefore can form good quality images in various environments.

Although pure water is used as the hydroxyl group-containing solvent in this embodiment, water, methanol, ethanol, a mixture of water and methanol or a mixture of water and ethanol can be also used. In addition to the above materials, other available solvent materials include, but are not limited to, a mixture of methanol and ethanol, propanol, butanol and so on.

In the solvent treatment step, the preferable solvent to be used is alcohol, water, or a mixture of water and alcohol. The solvent treatment step includes a treatment step using any one of alcohol, water and a mixture thereof as a solvent. Such a solvent is relatively stable and the aftertreatment can be conducted easily. In addition, the solvent is inexpensive and therefore cost-effective.

Oxidation of the granules is performed after the firing step in this embodiment; however, the timing of oxidation is not limited thereto, and can be performed, for example, after the solvent treatment step.

EXAMPLES

Carrier core particles were manufactured under various conditions through the above-described manufacturing method and their resistance values and so on were measured. Table 1 shows the manufacturing conditions of Examples 1 to 7, which were manufactured under various modified conditions, and the manufacturing conditions of Comparative Examples 1 to 3, which were manufactured without the solvent treatment according to the present invention. Table 2 shows values of resistance and other measured values of the carrier core particles of respective examples shown in Table 1.

Specific manufacturing method and conditions of Examples 1 to 7 and Comparative Examples 1 to 3 will be described as follows.

Example 1

10 kg of $Fe_2O_3$ (average particle diameter: 1 μm) and 0.05 kg of $Li_{0.5}Fe_{2.5}O_4$ (average particle diameter: 3 μm) were dispersed in 2.7 kg of water, and 100 g of ammonium polycarboxylate-based dispersant, 100 g of carbon black reducing agent and 133 g of SNOWTEX 50 were added to make a mixture. The solid concentration of the mixture was measured and resulted in 80 wt %. The mixture was pulverized by a wet ball mill (media diameter: 2 mm) to obtain mixture slurry.

The slurry was sprayed into hot air of approximately 130° C. by a spray dryer and turned into dried granulated powder. At this stage, granulated powder particles out of the target particle size distribution were removed by a sieve. The remaining granulated powder was placed in an electric furnace and fired at 1025° C. for 3 hours. During firing, gas was controlled to flow in the electric furnace such that the atmosphere in the electric furnace was adjusted to have an oxygen concentration of 0.01%. The obtained fired material was disintegrated and then classified by a sieve, thereby obtaining carrier core particles whose average particle diameter was 35 μm. The obtained carrier core particles were held at 520° C. for 1 hour under atmospheric pressure to be oxidized. The oxidized carrier core particles were subjected to the solvent treatment step to remove lithium on their top surfaces. First, 10 g of carrier core particles were put on a piece of filter paper, and 500 ml of pure water at a temperature of 30° C. was then poured from above the filter paper to remove lithium in the top surfaces of the particles. The carrier core particles with lithium removed were dried in a vacuum for 3 hours to remove water, thereby obtaining the carrier core particles of Example 1.

Example 2

The carrier core particles of Example 2 were obtained in the same manner as in Example 1, but the temperature during oxidization was set to 550° C. The magnetic and electrical characteristics of the resultant carrier core particles will be shown in Table 2.

Example 3

The carrier core particles of Example 3 were obtained in the same manner as in Example 2, but the solvent used in the solvent treatment step was methanol. The magnetic and electrical characteristics of the resultant carrier core particles will be shown in Table 2.

Example 4

The carrier core particles of Example 4 were obtained in the same manner as in Example 2, but the solvent used in the solvent treatment step was ethanol. The magnetic and electrical characteristics of the resultant carrier core particles will be shown in Table 2.

Example 5

The carrier core particles of Example 5 were obtained in the same manner as in Example 2, but the temperature of the solvent used in the solvent treatment step was 100° C. The magnetic and electrical characteristics of the resultant carrier core particles will be shown in Table 2.

Example 6

The carrier core particles of Example 6 were obtained in the same manner as in Example 2, but the solvent used in the solvent treatment step was tap water. The magnetic and electrical characteristics of the resultant carrier core particles will be shown in Table 2.

Example 7

The carrier core particles of Example 7 were obtained in the same manner as in Example 1, but the added lithium raw material was 0.25 kg of $Li_{0.5}Fe_{2.5}O_4$ (average particle diameter: 3 μm). The magnetic and electrical characteristics of the resultant carrier core particles will be shown in Table 2.

Comparative Example 1

The carrier core particles of Comparative Example 1 were made of the same materials as the carrier core particles of Example 1 in the same manner as in Example 1, but did not undergo the treatment step by the solvent and drying step. The magnetic and electrical characteristics of the resultant carrier core particles will be shown in Table 2.

Comparative Example 2

The carrier core particles of Comparative Example 2 were made of the same materials as the carrier core particles of Example 2 in the same manner as in Example 2, but did not undergo the treatment step by the solvent and drying step. The magnetic and electrical characteristics of the resultant carrier core particles will be shown in Table 2.

Comparative Example 3

The carrier core particles of Comparative Example 3 were made of the same materials as the carrier core particles of Example 7 in the same manner as in Example 1, but did not undergo the treatment step by the solvent and drying step. The magnetic and electrical characteristics of the resultant carrier core particles will be shown in Table 2.

[Table 1]
[Table 2]

The obtained carrier core particles were coated with resin by the following method. Silicone-based resin (product name: KR251, manufactured by Shin-Etsu Chemical Co., Ltd.) was dissolved in toluene to prepare a coating resin solution. Then, the carrier core particles and the prepared coating resin solution in a 9:1 weight ratio were introduced in an agitator that agitated the carrier core particles immersed in the coating resin solution for 3 hours and heated to 150° C. to 250° C. This coated the carrier core particles with 1.0 wt % of coating resin. The resin-coated carrier core particles were placed in a circulating hot air oven, heated at 250° C. for 5 hours to cure the coating resin layer, thereby obtaining carriers for electrophotographic developer according to Examples 1 to 7 and Comparative Examples 1 to 3.

The carriers for electrophotographic developer were mixed with commercially available toner particles of a few urn in diameter by a V-blender or pot mill to manufacture electrophotographic developer, and the image characteristics are evaluated.

The image characteristics were evaluated by using a digital reversal development type test machine operable at a copy speed of 40 copies per minute. Specifically, durability tests were conducted by copying 100K (K: 1000) pages with the electrophotographic developers under environments (low temperature and humidity (absolute humidity of 3.3 $g/m^3$) and high temperature and humidity (absolute humidity of 21 $g/m^3$)) to evaluate the carrier scattering, image density, fog level, fine line reproducibility and image quality. Among these evaluation items, "image quality" shows overall evaluation. The electrophotographic developers are rated as Excellent (⊚), Good (○), Fair (Δ) or Poor (x) on evaluation criteria. The evaluation "Good (○)" is as equivalent a level as currently available high performance electrophoto graphic developer, and therefore electrophotographic developers rated as "Good (○)" or higher are judged as passed. Results are shown in Table 3. All electrophotographic developers of Examples and Comparative Examples were evaluated in the same manner.

[Table 3]

Description will be now made about the amount of Li that leaches out in the solvent as shown in Table 1. Examples 1 to 7 and Comparative Examples 1 to 3 underwent a leach test. The leach test begins with weighing of the pure water and carrier core particles so as to establish that the weight ratio between the pure water and carrier core particles becomes 10/1. Specifically, 5 g of carrier core particles were immersed in 50 ml of pure water. Then, they were shaken for five minutes by a shaker, and the amount of lithium (Li) in the solvent was measured. The difference between the amount of lithium in the solvent before the carrier core particles were immersed and the amount of lithium in the solvent after shaking is regarded as the leach amount of lithium.

The shaker was Model SA-31 manufactured by Yamato Scientific Co., Ltd. and used at a speed of 10 (max). The amount of leached lithium was measured by ICP analysis. Before the measurement, the carrier core particles shaken by the shaker were removed from the pure water and the pure water was filtered by a membrane filter. The filtered pure water, which was a solvent, was subjected to ICP analysis to measure the lithium amount. The membrane filter used herein was DISMIC (trademark) 25HP (pore size: 0.45 μm, housing material: PTFE (Polytetrafluoroethylene)), manufactured by ADVANTEC Group. For the ICP analysis, a sequential plasma emission spectrometer ICPS-7510 manufactured by SHIMADZU CORPORATION was used and a calibration curve method was adopted to measure the leach amount by the ICP. The wavelength of Li was set to 670.785 nm.

The amounts of lithium that leaches out from the carrier core particles of Examples 1 to 7 were all 0.10 ppm or lower, more specifically, 0.010 ppm or lower. On the other hand, the amounts of lithium that leaches out from the carrier core particles of Comparative Examples 1 to 3 were all over 0.10 ppm.

In Table 1, the "oxidation temperature" denotes temperature (° C.) during the aforementioned oxidation step. The "solvent type" denotes the type of solvent used in the solvent treatment. The treatment is the filtering operation performed with the tools shown in FIG. 6. The carrier core particles underwent the treatment one time. The "treatment temperature" denotes temperature (° C.) during the treatment, in other words, the temperature of the solvent. The ratio of the core (g) to the solvent (ml), or the ratio of the carrier core particles to the solvent, is set to 10/1. In the treatment of this description, 10 g of the core is immersed in 100 ml of the solvent. The duration in which the carrier core particles of the respective examples underwent the treatment was 10 seconds.

Table 2 shows the measurement results of the resistance values at an absolute humidity of 21 $g/m^3$ and the resistance values at an absolute humidity of 3.3 $g/m^3$. The resistance values in Table 2 are logarithmically represented, specifically, $1\times10^6$ Ω·cm=Log R=6.0. In each level of absolute humidity, the resistance (Ω·cm) was measured with the application of 500 V/cm, 1000 V/cm, 2500 V/cm, 5000 V/cm, 7500 V/cm and 10000 V/cm. Table 2 indicates with "B.D." that a breakdown occurs. An example of the environment at an absolute humidity of 3.3 g/m$^3$ is an environment at a temperature of 10° C. and relative humidity of 40%. The environment at an absolute humidity of 21 g/m$^3$ may be, for example, an environment at a temperature of 30° C. and a relative humidity of 90%.

The "resistance difference" is a value obtained by subtracting the logarithm of the core resistance with the application of 1000 V/cm at an absolute humidity of 21 g/m$^3$ from the logarithm of the core resistance with the application of 1000 V/cm at an absolute humidity of 3.3 g/m$^3$. The "resistance ratio" is a value obtained by dividing the logarithm of the core resistance with the application of 1000 V/cm at an absolute humidity of 3.3 g/m$^3$ by the logarithm of the core resistance with the application of 1000 V/cm at an absolute humidity of 21 g/m$^3$. The "charge" denotes how much charge (μC/g) the carrier core particles can hold.

Measurement of the resistance values will be now described. The carrier core particles were placed for one day in environments shown by Table 2 while the humidity was controlled, and then measured in the environments. First, two SUS (JIS) 304 plates each having a thickness of 2 mm and a surface serving as an electrode made by electrolytic grinding were disposed on a horizontally placed insulating plate, or for example an acrylic plate coated with Teflon (trademark), so that the electrodes are spaced 1 mm apart. The two electrode plates were placed so that the normal lines to the plates are along the horizontal direction. After 200±1 mg of powder to be measured was charged in a gap between the two electrode plates, magnets having a cross-sectional area of 240 mm$^2$ were disposed behind the respective electrode plates to form a bridge made of the powder being measured between the electrodes. While keeping the state, DC voltages were applied between the electrodes in an increasing order of the voltage values, and the value of current passing through the powder being measured was measured by a two-terminal method to determine electric resistance values. For the measurement, a super megohmmeter, SM-8215 produced by HIOKI E. E. CORPORATION, was used. The electric resistance value is expressed by a formula: electric resistance value (Ω·cm) =measured resistance value (Ω)×cross-sectional area (2.4 cm$^2$)÷interelectrode distance (0.1 cm). As described above, the resistance values listed in Table 2 are represented logarithmically. When the electric resistance value (R) is 1×10$^6$ Ω·cm, Log R=6.0 is established. Note that the magnets in use can be anything as long as they can cause the powder to form a bridge. In this embodiment, a permanent magnet, for example, a ferrite magnet, whose surface magnetic flux density is 1000 gauss or higher was used.

Measurement of the amount of charge will be described. 9.5 g of the carrier core particles and 0.5 g of a toner for commercial full-color copying machines were put in a 100-ml glass bottle with a cap and the bottle was placed in an environment at 25° C. and 50 RH % for 12 hours to control the moisture as shown in Table 2. The moisture-controlled carrier core particles and toner were shaken for 30 minutes by a shaker and mixed. The shaker in use was a model NEW-YS produced by YAYOI CO., LTD., and operated at a shaking speed of 200/min and at an angle of 60°. From the mixture of the carrier core particles and toner, 500 mg of the mixture was weighed out and measured for the amount of charge by a charge measurement apparatus. In this embodiment, the measurement apparatus in use was a model STC-1-C1 produced by JAPAN PIO-TECH CO., LTD., and operated at a suction pressure of 5.0 kPa with a suction mesh made of SUS and with 500 mesh. Two samples of the same mixture were measured and the average of the measured values was defined as the core charge amount. The core charge amount is calculated by the following formula: core charge amount (μC (coulomb)/g)=measured charge (nC)×10$^3$×coefficient (1.0083×10$^{-3}$) ÷toner weight (weight before suction (g)−weight after suction (g)).

The amount of Li in the carrier core particles was measured by the following method. The carrier core particles dissolved in an acid solution were quantitatively analyzed with ICP. Table 1 shows Li contents in the carrier core particles and Table 2 shows Li contents in carrier core particles after the solvent treatment, both of which were amounts of Li quantitatively analyzed with ICP.

Referring to Tables 1 and 2, the charge amounts of the carrier core particles of Examples 1 to 7 are all 10 μC/g or higher, which are high core charge amounts. Even if the carrier core particles in the form of carrier are agitated in a developing machine and the coating resin is partially chipped off, such high charged carrier core particles can reduce the possibility of adversely affecting the image quality, which is preferable. On the contrary, the charge amounts of the carrier core particles of Comparative Examples 1 to 3 are 4.3 μC/g, 6.2 μC/g and 2.6 μC/g, respectively, those of which are all lower than 10 μC/g, which are low core charge amounts.

In Examples 1 to 7, the largest difference between the resistance values is 2.34, but the resistance differences are at least 2.50 or lower. On the contrary, the resistance differences of Comparative Examples 1 to 3 are 3.73, 2.74, 3.28, respectively, which are at least over 2.50.

In summary, the carrier core particles for electrophotographic developer according to the present invention exhibit a difference of 2.50 or lower between the logarithm of the core resistance with the application of 1000 V/cm at an absolute humidity of 21 g/m$^3$ and the logarithm of the core resistance with the application of 1000 V/cm at an absolute humidity of 3.3 g/m$^3$.

In addition, the highest ratio between the resistance values is 1.22, but all resistance ratios are at least 1.25 or lower. On the contrary, the resistance ratios of Comparative Examples 1 to 3 are 1.44, 1.26, 1.39, respectively, which are at least over 1.25.

In summary, the carrier core particles for electrophotographic developer according to the present invention exhibit a ratio of 1.25 or lower between the logarithm of the core resistance with the application of 1000 V/cm at an absolute humidity of 21 g/m$^3$ and the logarithm of the core resistance with the application of 1000 V/cm at an absolute humidity of 3.3 g/m$^3$.

Comparing the resistance difference between Example 1 and Example 5 proves that there is a tendency for the resistance difference to decrease with an increase in the treatment temperature. Therefore, increasing the treatment temperature is the way to decrease the resistance difference.

Referring to Table 3, in either a low temperature and humidity environment where the absolute humidity is 3.3 g/m$^3$ and a high temperature and humidity environment where the absolute humidity is 21 g/m$^3$, the image density, image fog, fine line reproducibility and image quality of Examples 1 to 7 are evaluated excellent or good. On the contrary, Comparative Examples 1 to 3 have excellent or good image density, image fog, fine line reproducibility and image quality in a low temperature and humidity environment where the absolute humidity is 3.3 g/m$^3$; however, some of Comparative Examples 1 to 3 have poor image density, image fog, fine line reproducibility and image quality in a high temperature and humidity environment where the absolute humidity is 21 g/m$^3$.

The following describes the principle of the present invention. Comparative Examples 1 to 3, which are not subjected to the solvent treatment, have lithium added as the core composition in the top surface of the carrier core particles. It is considered that the lithium present in the top surfaces of the carrier core particles dissolves in moisture in a high absolute humidity environment where the moisture level is relatively high and the lithium dissolved in moisture causes resistance reduction. On the other hand, lithium present in the top surfaces of the carrier core particles of Examples 1 to 7 is removed in advance by the solvent treatment. This mostly eliminates the phenomenon in which the lithium dissolved in moisture causes the resistance reduction even in a high absolute humidity environment. Because of this, the carrier core particles according to the invention are considered to have low environmental dependency.

Table 4 shows the relationship between the amount (ppm) of lithium that leaches out into the solvent after the solvent treatment step and the shaking time (minutes) to compare Example 1, Example 7 and Comparative Example 4. The carrier core particles of Comparative Example 4 contain $Fe_3O_4$ as a core composition, but not contain Li.

[Table 4]

A consideration of lithium will be given by referring to Table 4. The amount of leached lithium of Example 1 is 0.116 ppm after 1 minute of shaking and keeps increasing with an increase in shaking time to reach 0.127 ppm in 30 minutes of shaking. The amount of leached lithium of Example 7 is 0.280 ppm after 1 minute of shaking and keeps increasing with an increase in shaking time to reach 0.467 ppm in 30 minutes of shaking. This proves that the carrier core particles of Examples 1 and 7 contain lithium in the top surfaces in proportion to the amount of lithium added, and the lithium present in the top surfaces of the carrier core particles is mostly dissolved by the solvent treatment immediately and removed from the top surfaces of the carrier core particles. On the contrary, the carrier core particles of Comparative Example 4, which do not contain lithium as a core composition, have little lithium to be leached out. Even after 30 minutes, the amount of leached lithium is 0.009 ppm, which is 0.10 ppm or under, more specifically, less than 0.010 ppm. In other words, the solvent treatment reduces the lithium present in the top surface of the carrier core particles of Examples 1 and 7 to an amount equivalent of that contained in the carrier core particles that do not contain lithium as a core composition. This can be supported by the fact that the Li content of the carrier core particles after the solvent treatment shown in Table 2 is slightly less than the Li content of the carrier core particles before the solvent treatment shown in Table 1.

In the present invention, the method for manufacturing the carrier core particles starts adding lithium as a core composition to provide appropriate electrical resistance to the carrier core particles and later removes the lithium in the top surfaces of the carrier core particles by the solvent treatment, because the lithium present in the top surfaces of the carrier core particles is unfavorable in terms of environmental dependency.

Although the manufacturing method in the embodiment shown in FIG. 4 includes the solvent treatment step to maintain the amount of leached lithium to be 0.10 ppm or lower, the present invention is not limited thereto. In addition to the removal of lithium in the top surfaces of the carrier core particles by the solvent treatment, the lithium in the top surfaces of the carrier core particles can be selectively removed by physical means to reduce the amount of lithium in the top surfaces of the carrier core particles, but maintain the amount of leached lithium to be 0.10 ppm or lower. The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The carrier core particles for electrophotographic developer according to the invention, the method for manufacturing the carrier core particles, the carrier for electrophotographic developer, and the electrophotographic developer can be effectively used when applied to copying machines or the like in various usage environments.

REFERENCE SIGNS LIST 11, 19: carrier core particle; 12: carrier; 13: developer; 14: toner; 16: funnel; 17: filter paper; and 18: conical flask.

TABLE 1

| | Carrier Core Particles | | Leach | Solvent Treatment Conditions | |
|---|---|---|---|---|---|
| | Li Content ppm | Oxidation Temperature ° C. | amount of Li ppm | Solvent Type | Treatment Temperature ° C. |
| Example 1 | 51 | 520 | 0.007 | Pure Water | 30 |
| Example 2 | 53 | 550 | 0.006 | Pure Water | 30 |
| Example 3 | 55 | 550 | 0.005 | Methanol | 30 |
| Example 4 | 54 | 550 | 0.008 | Ethanol | 30 |
| Example 5 | 55 | 550 | 0.006 | Pure Water | 100 |
| Example 6 | 53 | 550 | 0.007 | Tap Water | 30 |
| Example 7 | 360 | 520 | 0.010 | Pure Water | 30 |
| Comparative Example 1 | 51 | 520 | 0.124 | Without Solvent Treatment | |
| Comparative Example 2 | 53 | 550 | 0.130 | Without Solvent Treatment | |
| Comparative Example 3 | 360 | 520 | 0.302 | Without Solvent Treatment | |

TABLE 2

| | Absolute Humidity 21 (g/m³) | | | | | | Absolute Humidity 3.3 (g/m³) | | | | | | Resistance Difference (1000 V/cm) | Resistance Ratio (1000 V/cm) | Charge μC/g | Li Content in Particles after Solvent Treatment ppm | Li Content in Solvent ppm |
|---|---|---|---|---|---|---|---|---|---|---|---|---|---|---|---|---|---|
| | 500 V/cm | 1000 V/cm | 2500 V/cm | 5000 V/cm | 7500 V/cm | 10000 V/cm | 500 V/cm | 1000 V/cm | 2500 V/cm | 5000 V/cm | 7500 V/cm | 10000 V/cm | | | | | |
| Example 1 | 10.3 | 10.3 | 10.2 | B.D. | B.D. | B.D. | 12.3 | 12.1 | 11.6 | 11.1 | 10.6 | 10.1 | 1.74 | 1.17 | 16.8 | 50 | 0.13 |

TABLE 2-continued

|  | Absolute Humidity 21 (g/m³) | | | | | | Absolute Humidity 3.3 (g/m³) | | | | | | Resistance Difference (1000 V/cm) | Resistance Ratio (1000 V/cm) | Charge μC/g | Li Content in Particles after Solvent Treatment ppm | Li Content in Solvent ppm |
|---|---|---|---|---|---|---|---|---|---|---|---|---|---|---|---|---|---|
|  | 500 V/cm | 1000 V/cm | 2500 V/cm | 5000 V/cm | 7500 V/cm | 10000 V/cm | 500 V/cm | 1000 V/cm | 2500 V/cm | 5000 V/cm | 7500 V/cm | 10000 V/cm |  |  |  |  |  |
| Example 2 | 10.7 | 10.8 | 10.7 | 10.5 | B.D. | B.D. | 12.8 | 13.1 | 12.7 | 12.3 | 11.9 | 11.5 | 2.34 | 1.22 | 16.0 | 52 | 0.13 |
| Example 3 | 9.5 | 9.9 | 10.2 | 10.2 | 9.8 | B.D. | 12.0 | 12.1 | 11.8 | 11.7 | 11.4 | 11.1 | 2.15 | 1.22 | 16.3 | 54 | 0.12 |
| Example 4 | 10.0 | 10.3 | 10.0 | 9.6 | 9.3 | B.D. | 12.2 | 12.0 | 11.6 | 11.0 | 10.5 | 10.0 | 1.70 | 1.17 | 15.8 | 53 | 0.13 |
| Example 5 | 10.8 | 10.8 | 10.7 | 10.4 | 10.1 | B.D | 12.3 | 12.1 | 11.6 | 11.1 | 10.6 | 10.1 | 1.29 | 1.12 | 16.5 | 53 | 0.12 |
| Example 6 | 10.3 | 10.4 | 10.4 | 10.4 | 10.0 | 9.3 | 12.5 | 12.3 | 11.8 | 11.2 | 10.8 | 10.5 | 1.94 | 1.19 | 15.5 | 52 | 0.13 |
| Example 7 | 9.2 | 9.3 | 9.3 | B.D. | B.D. | B.D. | 11.2 | 11.1 | 10.7 | 10.1 | 9.3 | B.D. | 1.80 | 1.19 | 13.8 | 359 | 0.32 |
| Comparative Example 1 | 8.5 | 8.5 | B.D. | B.D. | B.D. | B.D. | 12.5 | 12.2 | 11.8 | 11.0 | 10.0 | B.D. | 3.73 | 1.44 | 4.3 | — | — |
| Comparative Example 2 | 10.6 | 10.6 | 10.6 | 10.5 | 10.0 | B.D. | 13.0 | 13.3 | 12.9 | 12.3 | 12.0 | 11.5 | 2.74 | 1.26 | 6.2 | — | — |
| Comparative Example 3 | 8.2 | 8.3 | B.D. | B.D. | B.D. | B.D. | 11.5 | 11.6 | 11.0 | 10.8 | 10.0 | B.D. | 3.28 | 1.39 | 2.6 | — | — |

TABLE 3

|  | Absolute Humidity 3.3 g/m³ (Low Temperature and Humidity) | | | | Absolute Humidity 21 g/m³ (High Temperature and Humidity) | | | |
|---|---|---|---|---|---|---|---|---|
|  | Image Density | Image Fog | Fine Line Reproducibility | Image Quality | Image Density | Image Fog | Fine Line Reproducibility | Image Quality |
| Example 1 | ◎ | ◎ | ◎ | ◎ | ◎ | ◎ | ○ | ◎ |
| Example 2 | ◎ | ◎ | ◎ | ◎ | ◎ | ◎ | ◎ | ◎ |
| Example 3 | ◎ | ◎ | ◎ | ◎ | ◎ | ○ | ○ | ◎ |
| Example 4 | ◎ | ◎ | ◎ | ◎ | ◎ | ◎ | ○ | ◎ |
| Example 5 | ◎ | ◎ | ◎ | ◎ | ◎ | ◎ | ◎ | ○ |
| Example 6 | ◎ | ◎ | ◎ | ◎ | ○ | ◎ | ○ | ○ |
| Example 7 | ◎ | ◎ | ◎ | ◎ | ○ | ◎ | ○ | ○ |
| Comparative Example 1 | ◎ | ◎ | ◎ | ◎ | Δ | X | Δ | X |
| Comparative Example 2 | ◎ | ○ | ◎ | ◎ | X | Δ | X | X |
| Comparative Example 3 | ○ | ◎ | ◎ | ◎ | X | X | X | X |

TABLE 4

|  | Shaking Time Minute | Leach amount of Li ppm |
|---|---|---|
| Example 1 | 0 | 0.000 |
|  | 1 | 0.116 |
|  | 5 | 0.124 |
|  | 10 | 0.126 |
|  | 30 | 0.127 |
| Example 7 | 0 | 0.000 |
|  | 1 | 0.280 |
|  | 5 | 0.302 |
|  | 10 | 0.321 |
|  | 30 | 0.348 |
| Comparative | 0 | 0.000 |
| Example 4 | 1 | 0.008 |
|  | 5 | 0.008 |
|  | 10 | 0.008 |
|  | 30 | 0.009 |
| Pure Water | — | 0.000 |

The invention claimed is:
1. Carrier core particles for an electrophotographic developer, the carrier core particles containing lithium, wherein the amount of lithium contained in the carrier core particles is 10 ppm to 400 ppm.

2. The carrier core particles for an electrophotographic developer according to claim 1, wherein
a difference between a logarithm of a core resistance of the carrier core particles with an application of 1000 V/cm at an absolute humidity of 21 g/m³ and the logarithm of the core resistance of the carrier core particles with the application of 1000 V/cm at an absolute humidity of 3.3 g/m³ is 2.50 or less.

3. The carrier core particles for an electrophotographic developer according to claim 1, wherein
a ratio between a logarithm of a core resistance of the carrier core particles with an application of 1000 V/cm at an absolute humidity of 21 g/m³ and the logarithm of the core resistance of the carrier core particles with the application of 1000 V/cm at an absolute humidity of 13 g/m³ is 1.25 or less.

4. A carrier for an electrophotographic comprising:
carrier core particles containing lithium; and
a resin coating on surfaces of the carrier core particles;
wherein the amount of lithium contained in the carrier core particles is 10 ppm to 400 ppm.

5. An electrophotographic developer used to develop electrophotographic images comprising:
a carrier including carrier core particles containing lithium and resin covering surfaces of the carrier core particles; and
a toner that can be triboelectrically charged by frictional contact with the carrier for development of the electrophotographic images;
wherein the amount of lithium contained in the carrier core particles for electrophotographic developer is 10 ppm to 400 ppm.

6. The carrier for an electrophotographic developer according to claim 4, wherein, in a state where the carrier core particles are immersed in pure water at a weight ratio of 1 part core particles to 10 parts pure water and shaken, the amount of lithium that leaches out to the pure water is 0.10 ppm or lower.

7. An electrophotographic developer used to develop electrophotographic images according to claim 5, wherein, in a state where the carrier core particles are immersed in pure water at a weight ratio of 1 part core particles to 10 parts pure water and shaken, the amount of lithium that leaches out to the pure water is 0.10 ppm or lower.

8. The carrier core particles for an electrophotographic developer according to claim 1, wherein, in a state where the carrier core particles are immersed in pure water at a weight ratio of 1 part core particles to 10 parts pure water and shaken, the amount of lithium that leaches out to the pure water is 0.10 ppm or lower.

* * * * *

UNITED STATES PATENT AND TRADEMARK OFFICE
CERTIFICATE OF CORRECTION

PATENT NO. : 8,617,781 B2  Page 1 of 1
APPLICATION NO. : 13/522398
DATED : December 31, 2013
INVENTOR(S) : Kawauchi It is certified that error appears in the above-identified patent and that said Letters Patent is hereby corrected as shown below:

In the Claims:

Column 21, Line 15:

"application of 1000 V/cm at an absolute humidity of 13" should read:
"application of 1000 V/cm at an absolute humidity of 3.3"

Signed and Sealed this
Seventeenth Day of June, 2014

Michelle K. Lee
*Deputy Director of the United States Patent and Trademark Office*